(12) United States Patent
McKenna

(10) Patent No.: US 7,971,390 B2
(45) Date of Patent: Jul. 5, 2011

(54) IRRIGATION APPARATUS

(75) Inventor: Malachi Christopher McKenna, London (GB)

(73) Assignee: D&K Products Limited, Hampshire (GB)

( * ) Notice: Subject to any disclaimer, the term of this patent is extended or adjusted under 35 U.S.C. 154(b) by 92 days.

(21) Appl. No.: 12/161,895

(22) PCT Filed: Jan. 19, 2007

(86) PCT No.: PCT/GB2007/000158
§ 371 (c)(1),
(2), (4) Date: Nov. 13, 2008

(87) PCT Pub. No.: WO2007/085799
PCT Pub. Date: Aug. 2, 2007

(65) Prior Publication Data
US 2009/0178335 A1 Jul. 16, 2009

(30) Foreign Application Priority Data

Jan. 24, 2006 (GB) .................................. 0601391.6
Oct. 16, 2006 (GB) .................................. 0620491.1

(51) Int. Cl.
*A01G 25/00* (2006.01)
(52) U.S. Cl. .......................................... 47/79; 47/59 R
(58) Field of Classification Search .............. 47/79, 65, 47/65.5, 66.7, 82, 59 R, 62 R, 62 E, 63, 60, 47/61; 239/67, 68, 99, 570, 572; 141/83, 141/359; *A01G 27/00, 27/02*
See application file for complete search history.

(56) References Cited

U.S. PATENT DOCUMENTS

| | | | | |
|---|---|---|---|---|
| 1,780,279 A | * | 11/1930 | Smith | 47/79 |
| 2,198,309 A | * | 4/1940 | James | 177/117 |
| 2,281,068 A | * | 4/1942 | Farnham | 47/64 |
| 2,828,935 A | * | 4/1958 | Ziegler et al. | 177/117 |
| 3,168,797 A | * | 2/1965 | Patassy | 47/79 |
| 3,906,667 A | * | 9/1975 | Williams | 47/79 |
| 4,177,604 A | * | 12/1979 | Friesen | 47/62 R |
| 4,241,538 A | * | 12/1980 | Lahr | 47/79 |
| 5,020,261 A | * | 6/1991 | Lishman | 47/79 |
| 5,351,437 A | * | 10/1994 | Lishman | 47/79 |
| 5,421,515 A | * | 6/1995 | Rinkewich | 239/68 |
| 2004/0045218 A1 | | 3/2004 | Muxlow | |

FOREIGN PATENT DOCUMENTS

| DE | 0202004019122 | 4/2005 |
|---|---|---|
| GB | 1172812 | 12/1969 |
| JP | 02-76524 | * 3/1990 |

(Continued)

*Primary Examiner* — Andrea M Valenti
(74) *Attorney, Agent, or Firm* — RatnerPrestia

(57) ABSTRACT

An irrigation apparatus provides water to one or more plants growing in a growing medium contained in a pot or tray. The irrigation apparatus includes a water container mounted to a base below the tray for vertical movement between an upper position and a lower position, in which the water container is urged toward the upper position. Also included is a water supply for supplying water to the water container, the water supply including a control valve having an open and a closed position for permitting and preventing flow of water into the water container, respectively, the control valve closes when the water container is in its lower position. The arrangement is such that when the water container contains water and is in its lower position, the surface of the water in the water container is at a predetermined distance below the underside of the tray supported on the base.

9 Claims, 2 Drawing Sheets

FOREIGN PATENT DOCUMENTS

Figure 1:
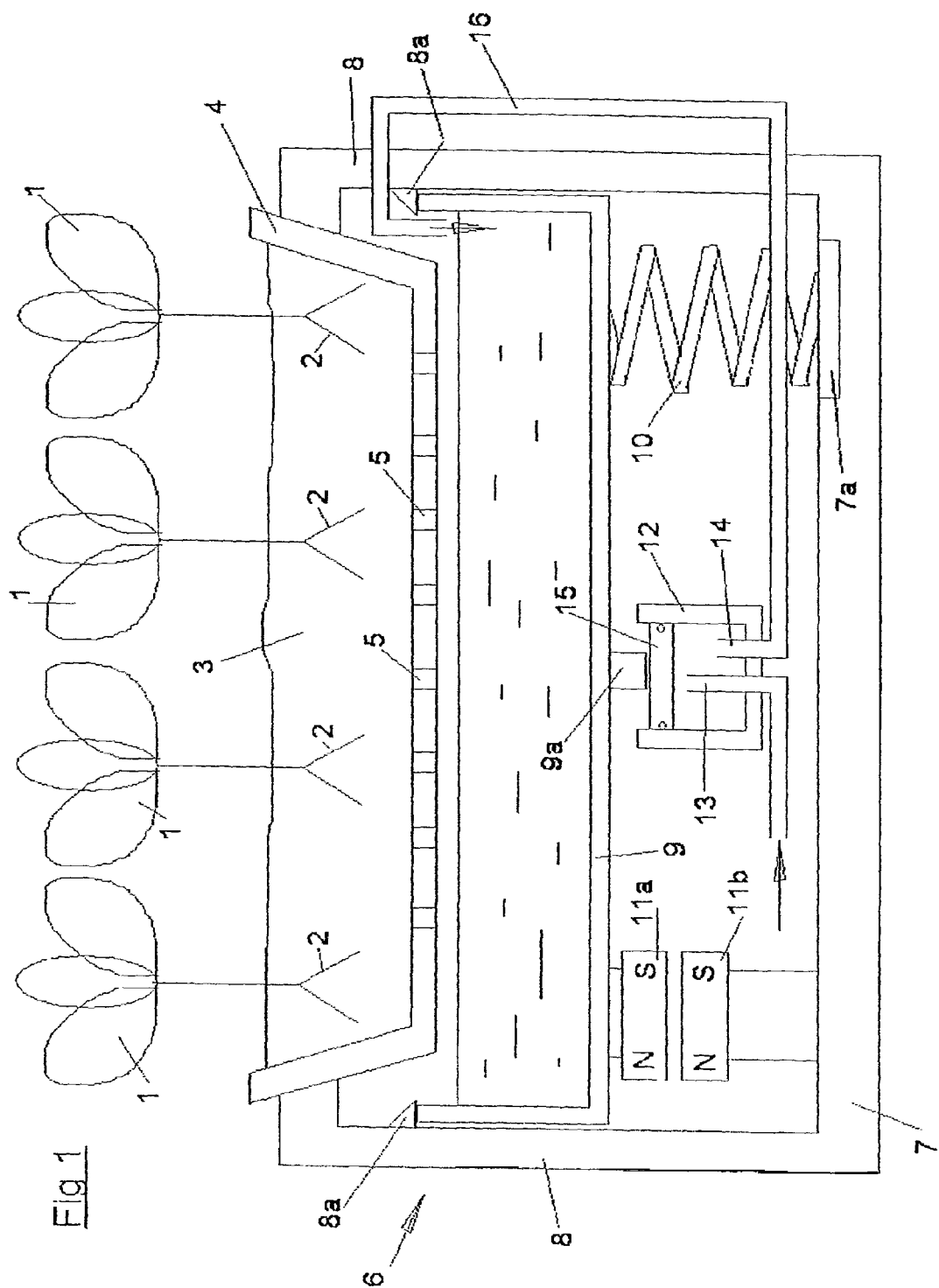

| | | | |
|---|---|---|---|
| JP | 09-233961 | * | 9/1997 |
| JP | 2002-253069 | * | 9/2002 |
| JP | 2005-198613 | * | 7/2005 |
| WO | WO 9206587 | | 4/1992 |

* cited by examiner

IRRIGATION APPARATUS

This application is the U.S. National Phase Application of PCT International Application No. PCT/GB2007/000158, filed Jan. 19, 2007 (incorporated by reference herein in its entirety), and claims priority of GB Patent Application Nos. GB0601391.6 filed Jan. 24, 2006 and GB0620491.1 filed Oct. 16, 2006.

The present invention relates to irrigation apparatus, and is particularly concerned with an apparatus for providing water or liquid nutrient to plants growing in pots or trays.

Plants growing in a porous growing medium are able to draw water by capillary action from a region below the level of the plant root. The conventional techniques of watering plants by applying moisture to the upper surface of their growing medium places the source of water at surface level, and does not encourage downward growth of plant roots.

GB Patent 1,172,812 describes a watering system for potted plants in which the plant is placed, in its pot, on a weighing platform, and the supply of water is controlled so as to produce a predetermined total weight of the plant, growing medium, pot and water.

A disadvantage of the prior art arrangement is that, as the plant grows in size it necessarily gains in weight, and the situation can arise that the combined weight of the plant, growing medium and pot becomes equal to the preset total weight, and thus no further water is added.

An objective of the present irrigation apparatus is to provide a plant watering apparatus which overcomes the difficulty of the prior art.

A further objective of the present invention is to provide an irrigation apparatus which encourages plant roots to grow downwardly into the growing medium, by situating the source of water or liquid nutrient below the level of the plant roots.

According to a first aspect of the present invention, there is provided an irrigation apparatus for providing water to one or more plants growing in a growing medium contained in a pot or tray, the irrigation apparatus comprising:

a water container mounted to a base below the tray for vertical movement between an upper position and a lower position;

resilient means mounted to the base to urge the water container toward the upper position;

water supply means for supplying water to the water container, the water supply means including a control valve having an open and a closed position for permitting and preventing flow of water into the water container, respectively; and operating means mounted to the water container and operable to close the control valve when the water container is in its lower position;

the arrangement being such that when the water container contains water and is in its lower position, the surface of the water in the water container is at a predetermined distance below the underside of the tray supported on the base.

A second aspect of the present invention provides a method of irrigating one or more plants growing in a growing medium contained in a pot or tray, the method comprising:

supporting the tray on a base;

mounting a water container below the tray for vertical movement between an upper position and a lower position by resilient means urging the water container toward the upper position;

supplying water to the water container, by a water supply means including a control valve having an open and a closed position for permitting and preventing flow of water into the water container, respectively; and closing the control valve when the water container is in its lower position, by an operating means mounted to the water container, such that the surface of the water in the water container is at a predetermined distance below the underside of the tray.

Figure 2:
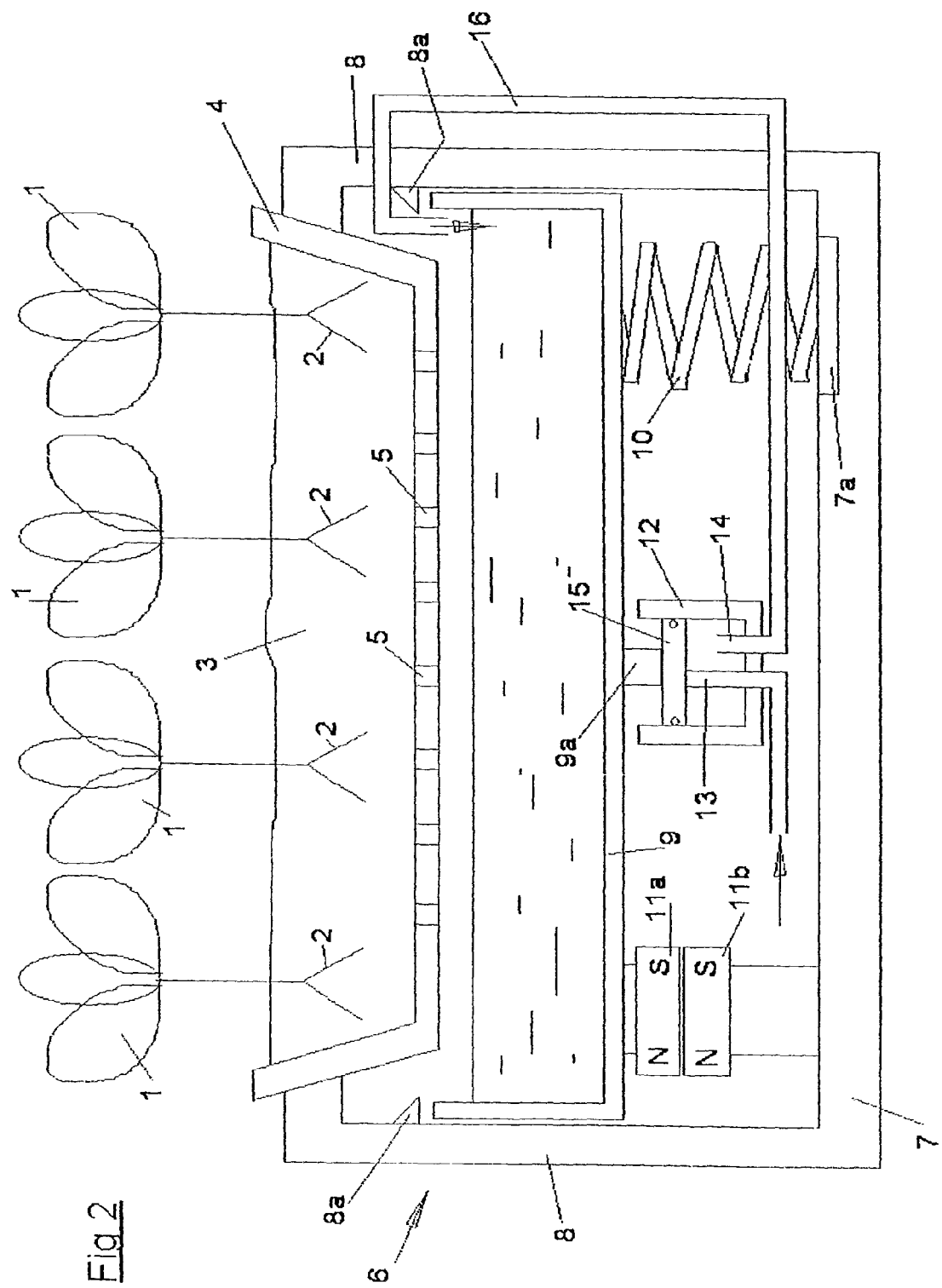

Embodiments of the present invention will now be described with reference to the accompanying drawing, in which:

FIG. 1 shows a schematic sectional view of a plant container and the irrigation apparatus of the present invention during filling of the water container; and FIG. 2 is a schematic sectional view similar to FIG. 1, with the water container filled.

Referring now to the Figures, there is seen a plurality of plants 1, whose roots 2 extend downwardly into a growing medium 3 contained in a tray 4. The tray 4 has a plurality of openings 5 in its base.

The tray 4 is supported by the irrigation apparatus 6 of the invention. The irrigation apparatus 6 comprises a base 7 at the ends of which are upstanding arms 8 which support the tray 4. The arms 8 also serve as a vertical guides for a movable water container 9 supported on the base 7 by means of springs 10. The springs 10 may be mounted with a predetermined amount of pre-compression, and the resilience of the springs 10 will ensure that the water container 9 will move downwardly as weight is added to the water container 9 by filling it with water.

As an alternative to springs, one or more pairs of opposed magnets 11a and 11b may be mounted to the water container 9 and to the base 7, respectively, with their unlike poles opposite one another to provide a repelling force to support the water container 9.

The underside of the water container 9 is provided with a downwardly-extending abutment 9a, the purpose of which will be described in detail below.

A control valve 12 is mounted beneath the water container 9. The control valve comprises an inlet port 13 and an outlet port 14, and an operating member 15 in the form of a piston vertically movable in the housing of the control valve 12. In the illustrated example, a downward vertical movement of the piston 15 will bring the underside of the piston into contact with the inlet port 13, to close the inlet port and prevent flow of water through the control valve 12. The outlet port 14 of the control valve 12 leads to a duct 16 which delivers water from the control valve 12 into the water container 9.

Alternative types of control valve may be used, linked to the water container so that the flow of water through the control valve is permitted when the water container 9 is in an upper position, and is prevented when the water container is moved to a lower position.

In operation of the irrigation apparatus, a water supply is connected to the inlet port 13 of the control valve 12. Water then flows through the control valve 12 and the duct 16, to fill the water container 9. As the water container fills, the weight of water in the container causes the springs 10 to compress, and the water container 9 moves downwardly as a result of this compression. The downward movement of the water container 9 brings the abutment 9a into engagement with the operating member 15 of the control valve 12, pushing the operating member 15 downwards to close the inlet port 13 and stop the flow of water. It will be appreciated that the rate of the springs 10, and the amount of pre-compression applied to the springs 10, will determine the relationship between the weight of water placed in the water container 9 and the amount of downward movement of the water container.

The springs 10 are adjusted so that the weight of water in the water container required to move the water container downwardly by the distance required to close the control valve 12 is such that the water surface in the water container 9 is at a predetermined level, and at a predetermined distance below the tray 4, when the control valve 12 closes to prevent further addition of water to the water container.

In the preferred embodiment, and the water container 9 is supported by three or more springs 10, the pre-compressions of the springs and the spring rates being adjusted so as to be substantially equal. In the most preferred embodiment, the tray 4, the water container 9 and the base 7 are rectangular in plan view, and four springs 10 provided, one at each of the corner regions of the water container 9. The pre-compression of the springs may be adjusted by providing a stop 8a on each arm 8 to limit the upward movement of the water container 9, and by providing an adjustable bearing pad 7a in the base 7 beneath the spring 10, the bearing pad 7a being vertically adjustable to increase or decrease the initial length of the spring 10 when the water container 9 is pressed upwardly against its limit stops 8a by the springs. Moving the bearing pad upwardly beneath the spring will shorten the length of the spring, and increase the pre-compression. In order to move the water container 9 downwardly against this increased pre-compression, more water will have to be added to the water container. The result will be that, when the water container has moved downwardly to the position in which the control valve 12 is closed, the water surface within the water container 9 will be at a higher level than was the case with the reduced level of pre-compression.

The water container 9 may be held in the upper position against the limit stops 8a until a predetermined weight of water has been added to the water container 9, whereupon the addition of further water to the water container will cause the springs 10 to be further compressed and the water container to move downwardly. This downward movement will increase the upward force exerted by the springs, but this upward force will be overcome by the addition of water to the water container until the water container has moved downwardly by a sufficient distance to close the control valve.

In an alternative embodiment, the pre-compression of the springs may be kept constant and weights may be added to the water container. In such an embodiment, when the water container has no weights added to it, a maximum quantity of water will be needed in the water container in order to compress the springs and close off the water supply. If one or more weights are added to the water container, then the total weight of the water container, the weights and the water required to close the water supply will result in a water level lower than the water level achieved when no weights were added to the water container. Clearly, the weights to be added to the water container may be placed within the water-containing part, but in this case the density of the weights will have to be greater than the density of water for their presence to have any effect. Alternatively, the weights may be attached to the outside of the water container.

Other types of control valve may be used as alternatives to the illustrated embodiment.

It is further foreseen that the water container may be supported at one point on a pivot, and supported on a spring at a second point remote from the pivot. The abutment 9a may be provided either between the pivot and the spring, or at a point on the side of the spring remote from the pivot.

In a further embodiment, movement of the water container 9 may be arranged to operate an electrical switch rather than a control valve. The electrical switch may be arranged to operate either an electromechanical valve or an electric pump, so as to allow all provided a flow of water into the water container. Downward movement of the water container against its resilient mounting will then operate the switch to close the electromechanical valve, or to stop the pump, when the water container reaches its lower position.

In the embodiment shown, the water container is an open-topped tray type of structure. It is foreseen that the water container may have a porous or foraminous cover, for example a mesh, to prevent foreign bodies from entering the water container.

In all of the above-described embodiments, it is emphasised that the container, the plant growing medium and the plant or plants are supported independently of the water container, and thus any increase in weight of the plant due to its growth does not influence the operation of the water container, so that the level of water in the water container remains at the preset position irrespective of the increase in the weight of the plants.

The invention claimed is:

1. An irrigation apparatus for providing water to one or more plants growing in a growing medium contained in a pot or tray supported in a fixed position, the irrigation apparatus comprising:
    a water container mounted for vertical movement relative to the fixed pot or tray between an upper position and a lower position and said water container vertically aligned with the fixed pot or tray;
    resilient means biasing the water container toward the upper position;
    means for supplying water to the water container;
    the means for supplying water including control means for selectively permitting and preventing flow of water into the water container, respectively; and
    the control means operable by operating means mounted below the water container to prevent flow of water when the water container is in its lower position;
    the arrangement being such that when the water container contains water and is in its lower position, the surface of the water in the water container is at a predetermined distance below the underside of the fixed pot or tray.

2. An irrigation apparatus according to claim 1, wherein the control means is a valve for controlling the flow of water.

3. An irrigation apparatus according to claim 1, wherein the means for supplying water includes an electromechanical valve, and the control means is an electrical switch arranged to operate the electromechanical valve.

4. An irrigation apparatus according to claim 1, wherein the means for supplying water includes an electric pump, and the control means is an electrical switch arranged to control the operation of the pump.

5. An irrigation apparatus according to claim 1, wherein the resilient means comprises one or more springs.

6. An irrigation apparatus according to claim 5, further comprising means for applying a pre-compression to said springs.

7. An irrigation apparatus according to claim 6, wherein the means for applying pre-compression to said springs includes adjusting means for varying the amount of pre-compression.

8. An irrigation apparatus according to claim 1, wherein the resilient means comprises one or more pairs of magnets having their like poles arranged opposite one another.

9. A method of irrigating one or more plants growing in a growing medium contained in a pot or tray, the method comprising:
    supporting the pot or tray in a fixed position;
    mounting a water container below and vertically aligned with the fixed pot or tray for vertical movement relative to the pot or tray between an upper position and a lower position by resilient means urging the water container toward the upper position;

supplying water to the water container, by water supply means mounted below the water container including a control valve having an open and a closed position for permitting and preventing flow of water into the water container, respectively; and closing the control valve when the water container is in its lower position, by operating means mounted to the water container, such that the surface of the water in the water container is at a predetermined distance below the underside of the tray.

* * * * *